(12) United States Patent
Cohen

(10) Patent No.: US 11,323,419 B2
(45) Date of Patent: May 3, 2022

(54) METHOD AND SYSTEM FOR ANONYMIZING SUBSETS SELECTED FROM DATASETS OF PARAMETERS RELATING TO A PLURALITY OF NETWORK-CONNECTED DEVICES

(71) Applicant: OTONOMO TECHNOLOGIES LTD., Even Yehuda (IL)

(72) Inventor: Avner Cohen, Kfar Haoranim (IL)

(73) Assignee: OTONOMO TECHNOLOGIES LTD., Even Yehuda (IL)

( * ) Notice: Subject to any disclaimer, the term of this patent is extended or adjusted under 35 U.S.C. 154(b) by 0 days.

(21) Appl. No.: 16/313,068

(22) PCT Filed: Jul. 17, 2018

(86) PCT No.: PCT/IL2018/050789
§ 371 (c)(1),
(2) Date: Dec. 24, 2018

(87) PCT Pub. No.: WO2019/016805
PCT Pub. Date: Jan. 24, 2019

(65) Prior Publication Data
US 2021/0226922 A1    Jul. 22, 2021

Related U.S. Application Data

(60) Provisional application No. 62/533,156, filed on Jul. 17, 2017.

(51) Int. Cl.
*H04L 29/06*    (2006.01)
(52) U.S. Cl.
CPC ............................... *H04L 63/0407* (2013.01)
(58) Field of Classification Search
CPC .................................................. H04L 63/0407
See application file for complete search history.

(56) References Cited

U.S. PATENT DOCUMENTS 6,804,602 B2 * 10/2004 Impson ................. G07C 5/008
701/117
7,194,465 B1    3/2007 MacGregor
(Continued)

OTHER PUBLICATIONS

Tomandl et al., PADAVAN: Privacy-Aware Data Accumulation for Vehicular Ad-hoc Networks, Oct. 2014, IEEE 10th International Conference on Wireless and Mobile Computing, Networking and Communications, pp. 487-493 (Year: 2014).*

(Continued)

*Primary Examiner* — Kenneth W Chang
(74) *Attorney, Agent, or Firm* — Pearl Cohen Zedek Latzer Baratz LLP

(57) ABSTRACT

A method and a system for selecting an anonymized subset of parameters from datasets of network-connected devices are provided herein. The method may include: obtaining a plurality of datasets, comprising a set of parameters related to one of a plurality of network-connected devices; automatically selecting a subset of parameters from at least one of the datasets, wherein the selecting is based on specified selection criteria; calculating an autocorrelation of the selected subset of parameters; calculating a correlation of the selected subset of parameters and one or more subsets of parameters selected from the datasets relating to network-connected devices other than said one of the plurality of network-connected devices; and applying the correlation and the autocorrelation to a decision function to determine whether the selected subset of parameters is an anonymized subset that is insufficient for determining an identity of the one of the plurality of the network-connected devices.

21 Claims, 4 Drawing Sheets

(56) References Cited

U.S. PATENT DOCUMENTS

| | | | | |
|---|---|---|---|---|
| 8,015,404 B2* | 9/2011 | Alrabady | ........... | G06Q 20/3674 |
| | | | | 713/168 |
| 8,321,952 B2* | 11/2012 | Spalink | ............... | G06F 21/6254 |
| | | | | 726/26 |
| 8,626,560 B1* | 1/2014 | Anderson | .......... | G06Q 30/0255 |
| | | | | 705/7.29 |
| 9,288,191 B1 | 3/2016 | Tock et al. | | |
| 9,527,515 B2* | 12/2016 | Hunt | ....................... | F01N 9/002 |
| 2006/0069473 A1 | 3/2006 | Sumcad et al. | | |
| 2006/0069749 A1* | 3/2006 | Herz | .................. | G06F 16/9535 |
| | | | | 709/219 |
| 2007/0239705 A1 | 10/2007 | Hunt et al. | | |
| 2008/0114991 A1 | 5/2008 | Jonas | | |
| 2010/0036884 A1* | 2/2010 | Brown | .................. | G06Q 30/00 |
| | | | | 706/21 |
| 2010/0312706 A1* | 12/2010 | Combet | ............. | G06Q 30/0204 |
| | | | | 705/50 |
| 2011/0110515 A1* | 5/2011 | Tidwell | ............ | H04N 21/25891 |
| | | | | 380/200 |
| 2015/0170175 A1* | 6/2015 | Zhang | .................. | H04M 15/44 |
| | | | | 705/7.33 |
| 2016/0241645 A1* | 8/2016 | Sabbaghian | ....... | G06Q 30/0265 |
| 2016/0293000 A1* | 10/2016 | Torgerson | ............... | H04W 4/14 |

OTHER PUBLICATIONS

International search report of PCT Application No. PCT/IL2018/050789, dated Nov. 28, 2018.

* cited by examiner

METHOD AND SYSTEM FOR ANONYMIZING SUBSETS SELECTED FROM DATASETS OF PARAMETERS RELATING TO A PLURALITY OF NETWORK-CONNECTED DEVICES

CROSS-REFERENCE TO RELATED APPLICATIONS

This application is a National Phase Application of PCT International Application No. PCT/IL2018/050789, International Filing Date Jul. 17, 2018, entitled: "METHOD AND SYSTEM FOR ANONYMIZING SUBSETS SELECTED FROM DATASETS OF PARAMETERS RELATING TO A PLURALITY OF NETWORK-CONNECTED DEVICES", which claims the benefit of U.S. Provisional Patent Application No. 62/533,156, filed Jul. 17, 2017, which is hereby incorporated by reference in its entirety.

FIELD OF THE INVENTION

The present invention relates generally to the anonymizing of datasets of a plurality of network-connected devices, and more particularly to anonymizing same by selecting anonymized subsets of the datasets.

BACKGROUND OF THE INVENTION

As network-connected devices become more and more popular today in the so-called Internet of Things (IoT) domain, more data relating to these network-connected devices are available for processing and analysis. In the fast-emerging domain of connected cars, it is believed that much of this data shall and will play an important role on primary and secondary data analysis vendors and clients.

For example, insurance companies will require specific data relating to activities carried out by individuals whose identity needs to be known. However, much of the data collected from network-connected entities, such as connected vehicles, is not required in order for sufficient identification of the entities or of the user associated with them.

In particular, many use cases actually need to be able to use collected data only provided that it has been anonymized in the sense that it is no longer possible to determine the identity of a specific network-connected entity based on datasets of parameters derived from it.

SUMMARY OF THE INVENTION

In accordance with some embodiments of the present invention, a method and a system for selecting an anonymized subset of parameters from datasets of entities are provided herein. The method may include: obtaining a plurality of datasets, comprising a set of parameters related to one of a plurality of network-connected devices; automatically selecting a subset of parameters from at least one of the datasets, wherein the selecting is based on specified selection criteria; calculating an autocorrelation of the selected subset of parameters; calculating a correlation of the selected subset of parameters and one or more subsets of parameters selected from the datasets relating to network-connected devices other than said one of the plurality of network-connected devices; and applying the correlation and the autocorrelation to a decision function to determine whether the selected subset of parameters is an anonymized subset that is insufficient for determining an identity of the one of the plurality of the network-connected devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
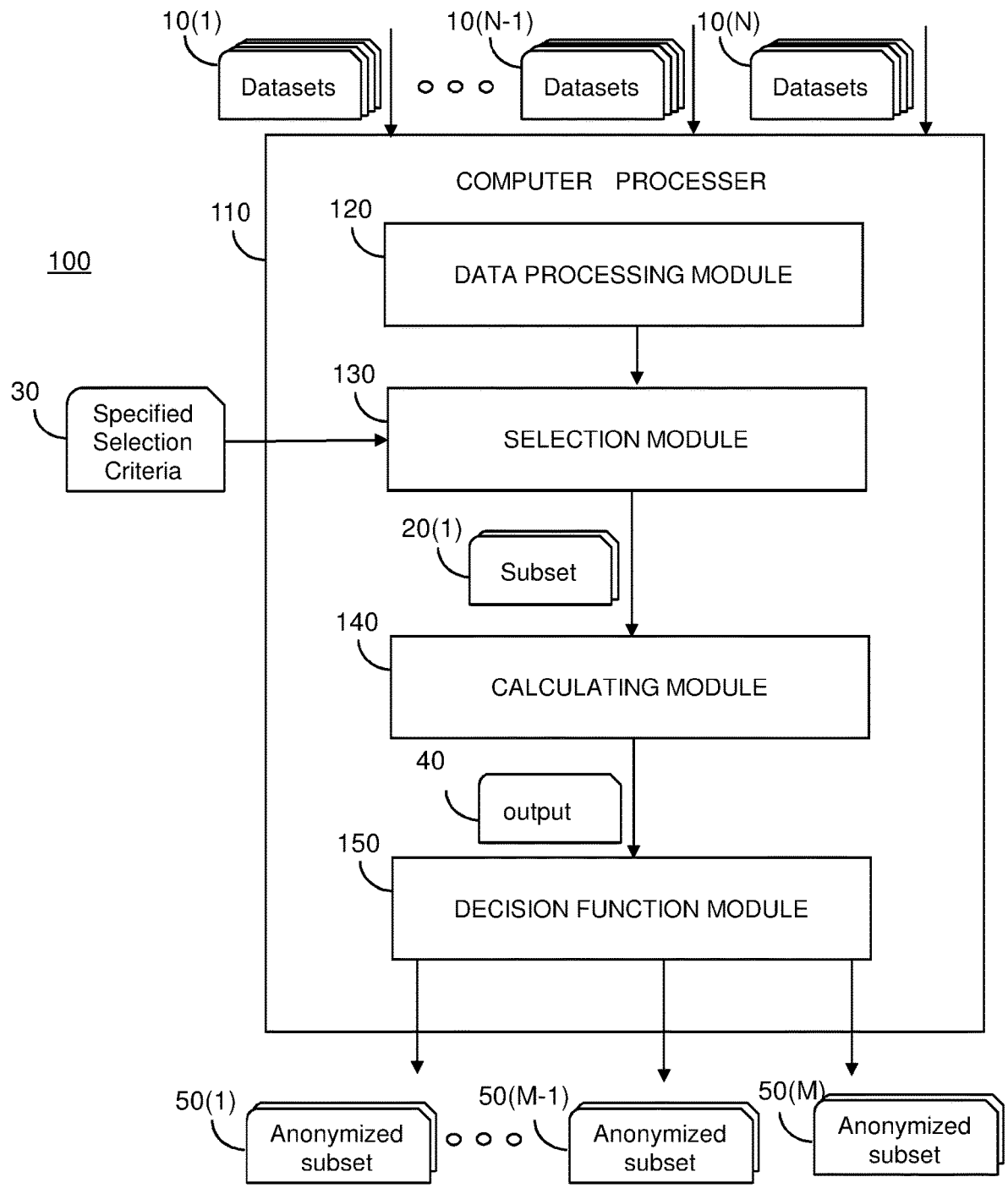
FIG. 1A is a block diagram illustrating non-limiting exemplary architecture of a system in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The term "correlation" as used herein is defined broadly as a dependence or association of any statistical relationship, whether causal or not, between two random variables or bivariate data. Correlation is defined herein as any of a broad class of statistical relationships involving dependence, and broader than its common usage referring to the extent to which two variables have a linear relationship with each other. Term "auto correlation" is similarly defined broadly as such a dependence or association of variables with themselves.

The term "quotient" as used herein is defined broadly than its common usage being the quantity produced by the division of two numbers and may include any operator that includes a fraction or a ratio.

FIG. 1A is a block diagram illustrating non-limiting exemplary architecture of a system in accordance with some embodiments of the present invention. System 100 may include a data processing module 120 configured to obtain a plurality of datasets 10(1) to 10(N), each dataset comprising a set of parameters related to one of a plurality of network-connected devices. System 100 may further include a computer processor 110 configured to: automatically select possibly via selection module 130 a subset 20(1) of parameters from at least one of the datasets relating to one of the plurality of network-connected devices, wherein the selecting is based on specified selection criteria 30; calculate possibly via calculation module 140 an autocorrelation of the selected subset of parameters; calculate possibly via calculation module 140 a correlation of the selected subset of parameters and one or more subsets of parameters selected from the datasets relating to network-connected devices other than said one of the plurality of network-connected devices, based on selection criteria that are identical to the specified selection criteria, to yield an output 40; and apply output 40 to decision function 150 to determine, based on the correlation and said autocorrelation and said selection criteria, whether said selected subset of parameters is an anonymized subset 50(1) to 50(M) that is insufficient for determining an identity of the one of the plurality of the network-connected devices.

According to some embodiments of the present invention, the decision function may include an operator applied to the correlation and the autocorrelation and further applies a threshold on an outcome of said operator beyond which said selected subset of parameters is considered an anonymized subset that is insufficient for determining an identity of the one of the plurality of the network-connected devices.

According to some embodiments of the present invention, in a case that that the output is not above said specified threshold, determining the selected subset of parameters as a subset that is sufficient for determining an identity of the one of the plurality of the network-connected devices and revising the selection criteria to similar and non-identical selection criteria.

According to some embodiments of the present invention, said operator is division and said output is a quotient of the correlation divided by said autocorrelation, wherein in a case that said quotient is above a specified threshold, determining said selected subset of parameters as an anonymized subset that is insufficient for determining an identity of the one of the plurality of the network-connected devices, and wherein in a case that that said quotient is not above said specified threshold, determining said selected subset of parameters as a subset that is sufficient for determining an identity of the said one of the plurality of the network-connected devices.

According to some embodiments of the present invention, the selection criteria include selecting a portion of a spatiotemporal space relating to said plurality of network-connected devices.

According to some embodiments of the present invention, the network-connected devices comprise connect vehicles and wherein said parameters include at least one activity of said connected vehicles, wherein said activity is further associated with at least one of: time of occurring, and location of occurring.

According to some embodiments of the present invention, the similar and non-identical selection criteria comprise a partial overlap of portions of a spatiotemporal space representing the respective selection criteria.

Figure 1B:
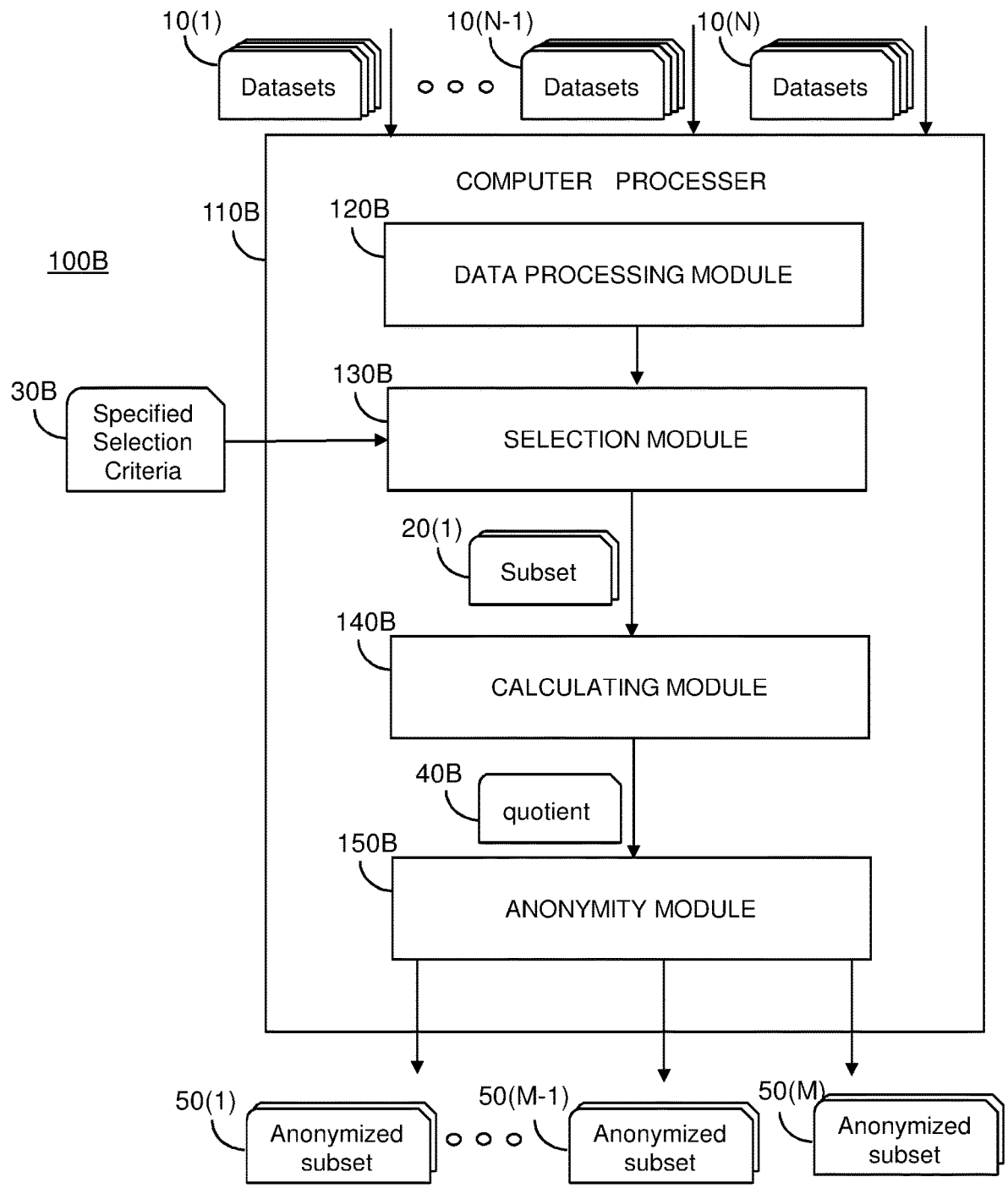
FIG. 1B is a block diagram illustrating another non-limiting exemplary architecture of a system in accordance with some embodiments of the present invention.

FIG. 1B is a block diagram illustrating another non-limiting exemplary architecture of a system in accordance with some embodiments of the present invention. According to some embodiments of the present invention, a system 100B for anonymizing subsets selected from datasets of parameters relating to a plurality of entities is provided herein. System 100B may be implemented by one or more computer processors 110B running a plurality of software modules. One such software module is data processing module 120B configured to obtain a plurality of datasets 10(1) to 10(N), each dataset includes a set of parameters related to one of a plurality of entities which are physical entities that may be, but are not limited to, connected cars (not shown). Another such software module is a selection module 130B configured to automatically select a subset 20(1) of parameters from at least one of the datasets 10(1) to 10(N) relating to one of the plurality of entities (in this example—entity to which database 10(1) relates) wherein the selecting is based on specified selection criteria 30B.

In accordance with some embodiments of the present invention, yet another software module included in system 100B may be a calculation module 140B configured to calculate an autocorrelation of the selected subset of parameters Calculation module 140B may be further configured to calculate a correlation or any statistical function of the selected subset of parameters and one or more subsets of parameters selected from the datasets relating to entities other than said one of the plurality of entities, based on selection criteria that are identical to said specified selection criteria. Calculation module 140B may be further configured to calculate a quotient 40B or any other operator or function of the correlation divided by the autocorrelation.

In accordance with some embodiments of the present invention, yet another software module present in system 100B is an anonymity module 150B configured to determine the selected subset of parameters as anonymized subsets 50(1) to 50(M) wherein M is the number of datasets and is independent of the number of network connected-devices N.

Any of anonymized subsets 50(1) to 50(M) are characterized in that they are insufficient for determining an identity of the one of the plurality of entities to which any of the original datasets 10(1) to 10(N) relate, in a case that its respective quotient 40B is above a specified threshold. It is understood that anonymity module 150 does not change any of the selected subsets (e.g., subset 20(1)) but rather determines whether an already selected subset meets the anonymity requirements based on quotient 40 and the specified threshold which may rely upon some probabilistic tolerance that is user defined and can be easily changed.

In accordance with some embodiments of the present invention, in a case that that quotient 40B is not above the specified threshold, the selected subset of parameters may be determined as a subset that is sufficient for determining an identity of the said one of the plurality of entities.

In a non-limiting example, the monitored parameters may include the geographical location in which any given connected car, out of a pool of 1000 cars, was detected to have its engine switched off within a time range from 8:30 am to 10:30 am. It is assumed that this location may indicate where people who work closely to each other park their car. If a certain car is located in one sample in a different location, its autocorrelation will be a low value. The cross correlation, however, will be high, and thus quotient 40B value will be high, which indicates an issue with anonymity. This is not surprising, as an individual car being parked somewhere else than its usual place serves as probabilistic indicator of the identity of that car.

In accordance with some embodiments of the present invention, in a case that that said quotient is not above said specified threshold, the method includes a step of revising the specified selection criteria and repeating the operation of: data selection module 130B, calculating module 140B, and anonymity module 150B with the revised specified selection criteria.

In accordance with some embodiments of the present invention, the selection criteria include selecting a portion of a spatiotemporal space relating to said plurality of entities.

In accordance with some embodiments of the present invention, entities comprise physical entities that are network-connected.

In accordance with some embodiments of the present invention, said entities comprise connect cars, and said parameters include at least one activity of said connected cars, wherein said activity is further associated with at least one of: time of occurring, and location of occurring.

In accordance with some embodiments of the present invention, said similar and non-identical selection criteria comprise a partial overlap of portions of a spatiotemporal space representing the respective selection criteria. Thus, in a non-limiting example, the selection criteria may include a period of two weeks for all entities, of a specified radius measured from a specified point on a map or both.

Figure 2:
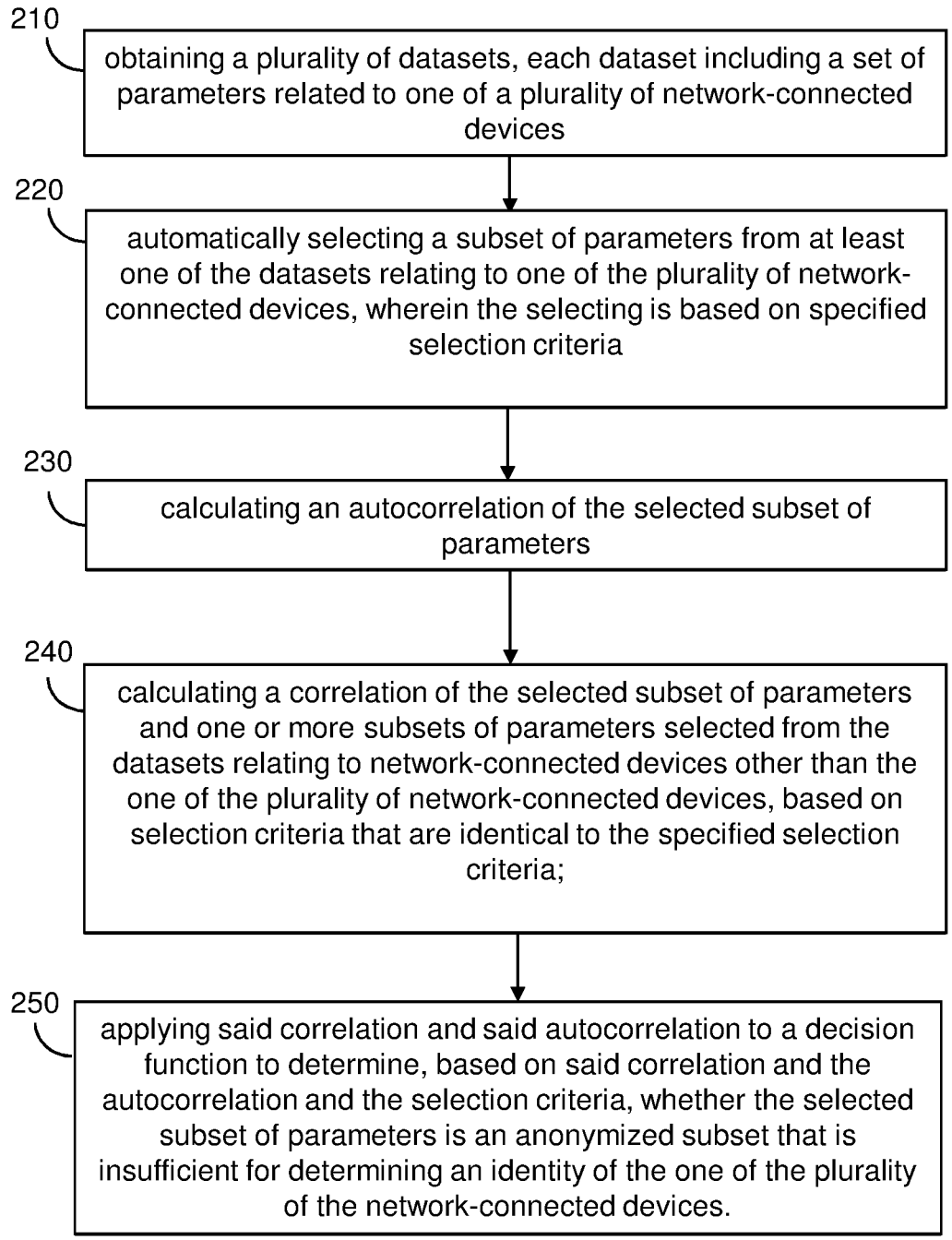
FIG. 2 is a high-level flowchart illustrating non-limiting exemplary method in accordance with embodiments of the present invention.

FIG. 2 is a high-level flowchart illustrating non-limiting exemplary method 200 for anonymizing subsets selected from datasets of parameters relating to a plurality of network-connected devices in accordance with some embodiments of the present invention Method 200 may include the following steps: obtaining a plurality of datasets, each dataset comprising a set of parameters related to one of a plurality of network-connected devices 210; automatically selecting a subset of parameters from at least one of the datasets relating to one of the plurality of network-connected devices, wherein the selecting is based on specified selection criteria 220; calculating an auto correlation of the selected subset of parameters 230; calculating a correlation of the selected subset of parameters and one or more subsets of parameters selected from the datasets relating to network-connected devices other than said one of the plurality of network-connected devices, based on selection criteria that are identical to said specified selection criteria 240; and applying the correlation and said autocorrelation to a decision function to determine, based on the correlation and said autocorrelation and said selection criteria, whether said selected subset of parameters is an anonymized subset that is insufficient for determining an identity of said one of the plurality of the network-connected devices 250.

Figure 3:
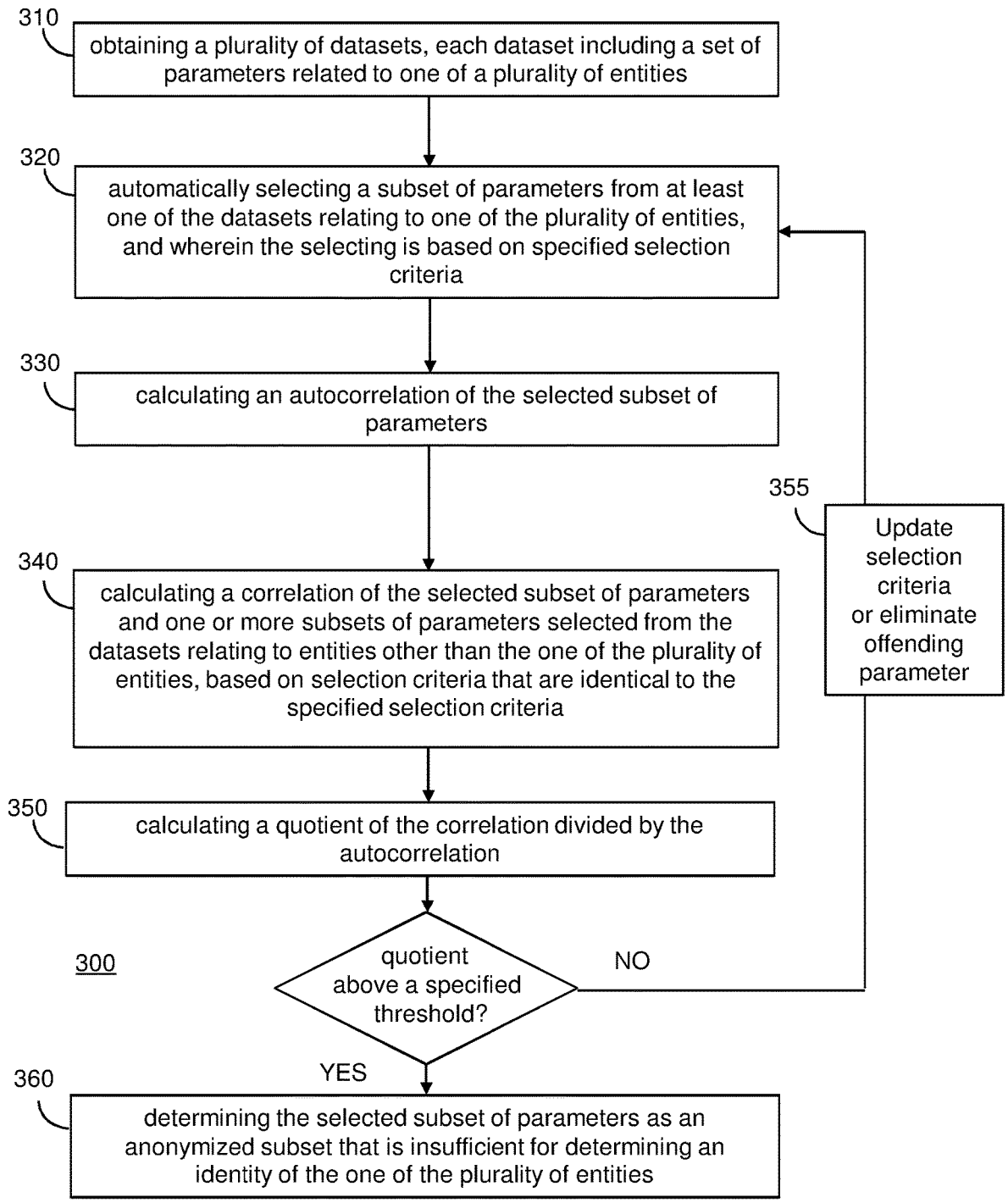
FIG. 3 is a high-level flowchart illustrating another non-limiting exemplary method in accordance with embodiments of the present invention.

FIG. 3 is a high-level flowchart illustrating non-limiting exemplary method 300 for anonymizing subsets selected from datasets of parameters relating to a plurality of network-connected devices in accordance with some embodiments of the present invention. Method 300 may include: obtaining a plurality of datasets, each dataset comprising a set of parameters related to one of a plurality of network-connected devices 310; automatically selecting a subset of parameters from at least one of the datasets relating to one of the plurality of network-connected devices, and wherein the selecting is based on specified selection criteria 320; calculating an autocorrelation of the selected subset of parameters and another subset of parameters selected from the datasets relating to said one of the plurality of network-connected devices, based on selection criteria that are similar but non-identical to said specified selection criteria 330; calculating a cross-correlation of the selected subset of parameters and one or more subsets of parameters selected from the datasets relating to network-connected devices other than said one of the plurality of network-connected devices, based on selection criteria that are identical to said specified selection criteria 340; calculating a quotient of the cross-correlation divided by said autocorrelation 350; and in a case that said quotient is above a specified threshold, determining said selected subset of parameters as an anonymized subset that is insufficient for determining an identity of the said one of the plurality of network-connected devices 360. In this case, method 300 goes on to either update the selection criteria or eliminate the offending parameter (the one that because of it, anonymization cannot be achieved) as in step 355. Then the method goes back to step 320 but with updated criteria or parameters.

In accordance with some embodiments of the present invention, in a case that that said quotient is not above said specified threshold, the method includes determining said selected subset of parameters as a subset that is sufficient for determining an identity of the said one of the plurality of network-connected devices 370.

In accordance with some embodiments of the present invention, in a case that that said quotient is not above said specified threshold, the method includes revising the specified selection criteria and repeating steps of the method with the revised specified selection criteria.

In accordance with some embodiments of the present invention, methods 200 and 300 may be effectively implemented using a non-transitory computer readable medium that includes a set of instructions that when executed cause at least one computer processor to: obtain a plurality of datasets, each dataset comprising a set of parameters related to one of a plurality of network-connected devices; automatically select a subset of parameters from at least one of the datasets relating to one of the plurality of network-connected devices, wherein the selecting is based on specified selection criteria; calculate an autocorrelation of the selected subset of parameters; calculate a correlation of the selected subset of parameters and one or more subsets of parameters selected from the datasets relating to network-connected devices other than the one of the plurality of network-connected devices, based on selection criteria that are identical to said specified selection criteria; and apply the correlation and the autocorrelation to a decision function to determine, based on the correlation and the autocorrelation and the selection criteria, whether the selected subset of parameters is an anonymized subset that is insufficient for determining an identity of the one of the plurality of the network-connected devices.

In order to implement the aforementioned method and non-transitory computer readable medium according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, some aspects of the present invention may be embodied as a system, method or computer program product. Accordingly, some aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Some methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   obtaining a plurality of datasets, each dataset comprising a set of parameters related to one of a plurality of network-connected devices;
   automatically selecting a subset of parameters from at least one of the datasets relating to one of the plurality of network-connected devices, wherein the selecting is based on specified selection criteria;
   calculating an autocorrelation of the selected subset of parameters;
   calculating a correlation of the selected subset of parameters and one or more subsets of parameters selected from the datasets relating to network-connected devices other than said one of the plurality of network-connected devices, based on selection criteria that are identical to said specified selection criteria;
   applying said correlation and said autocorrelation to a decision function to determine, based on said correlation and said autocorrelation and said selection criteria, whether said selected subset of parameters is an anonymized subset that is insufficient for determining an identity of said one of the plurality of the network-connected devices.

2. The method according to claim 1, wherein said decision function comprises an operator applied to said correlation and said autocorrelation and further applies a threshold on an outcome of said operator beyond which said selected subset of parameters is considered an anonymized subset that is insufficient for determining an identity of the said one of the plurality of the network-connected devices.

3. The method according to claim 2, wherein in a case that said outcome is not above said specified threshold, determining said selected subset of parameters as a subset that is sufficient for determining an identity of the said one of the plurality of the network-connected devices and revising said selection criteria to similar and non-identical selection criteria.

4. The method according to claim 2, wherein said operator is division and said outcome is a quotient of said correlation divided by said autocorrelation, wherein in a case that said quotient is above a specified threshold, determining said selected subset of parameters as an anonymized subset that is insufficient for determining an identity of the said one of the plurality of the network-connected devices, and wherein in a case that said quotient is not above said specified threshold, determining said selected subset of parameters as a subset that is sufficient for determining an identity of the said one of the plurality of the network-connected devices.

5. The method according to claim 1, wherein the selection criteria include selecting a portion of a spatiotemporal space relating to said plurality of network-connected devices.

6. The method according to claim 1, wherein said network-connected devices comprise connect vehicles and wherein said parameters include at least one activity of said connected vehicles, wherein said activity is further associated with at least one of: time of occurring, and location of occurring.

7. The method according to claim 3, wherein said similar and non-identical selection criteria comprise a partial overlap of portions of a spatiotemporal space representing the respective selection criteria.

8. A system comprising:
   a computer memory configured to obtain a plurality of datasets, each dataset comprising a set of parameters related to one of a plurality of network-connected devices; and a computer processor configured to:
automatically select a subset of parameters from at least one of the datasets relating to one of the plurality of network-connected devices, wherein the selecting is based on specified selection criteria;
calculate an autocorrelation of the selected subset of parameters;
calculate a correlation of the selected subset of parameters and one or more subsets of parameters selected from the datasets relating to network-connected devices other than said one of the plurality of network-connected devices, based on selection criteria that are identical to said specified selection criteria; and
apply said correlation and said autocorrelation to a decision function to determine, based on said correlation and said autocorrelation and said selection criteria, whether said selected subset of parameters is an anonymized subset that is insufficient for determining an identity of said one of the plurality of the network-connected devices.

9. The system according to claim 8, wherein said decision function comprises an operator applied to said correlation and said autocorrelation and further applies a threshold on an outcome of said operator beyond which said selected subset of parameters is considered an anonymized subset that is insufficient for determining an identity of the said one of the plurality of the network-connected devices.

10. The system according to claim 9, wherein in a case that said outcome is not above said specified threshold, determining said selected subset of parameters as a subset that is sufficient for determining an identity of the said one of the plurality of the network-connected devices and revising said selection criteria to similar and non-identical selection criteria.

11. The system according to claim 9, wherein said operator is division and said outcome is a quotient of said correlation divided by said autocorrelation, wherein in a case that said quotient is above a specified threshold, determining said selected subset of parameters as an anonymized subset that is insufficient for determining an identity of the said one of the plurality of the network-connected devices, and wherein in a case that said quotient is not above said specified threshold, determining said selected subset of parameters as a subset that is sufficient for determining an identity of the said one of the plurality of the network-connected devices.

12. The system according to claim 9, wherein the selection criteria include selecting a portion of a spatiotemporal space relating to said plurality of network-connected devices.

13. The system according to claim 8, wherein said network-connected devices comprise connect vehicles and wherein said parameters include at least one activity of said connected vehicles, wherein said activity is further associated with at least one of: time of occurring, and location of occurring.

14. The system according to claim 10, wherein said similar and non-identical selection criteria comprise a partial overlap of portions of a spatiotemporal space representing the respective selection criteria.

15. A non-transitory computer readable medium comprising a set of instructions that when executed cause at least one computer processor to:
obtain a plurality of datasets, each dataset comprising a set of parameters related to one of a plurality of network-connected devices;
automatically select a subset of parameters from at least one of the datasets relating to one of the plurality of network-connected devices, wherein the selecting is based on specified selection criteria;
calculate an autocorrelation of the selected subset of parameters;
calculate a correlation of the selected subset of parameters and one or more subsets of parameters selected from the datasets relating to network-connected devices other than said one of the plurality of network-connected devices, based on selection criteria that are identical to said specified selection criteria; and
apply said correlation and said autocorrelation to a decision function to determine, based on said correlation and said autocorrelation and said selection criteria, whether said selected subset of parameters is an anonymized subset that is insufficient for determining an identity of said one of the plurality of the network-connected devices.

16. The non-transitory computer readable medium according to claim 15, wherein said decision function comprises an operator applied to said correlation and said autocorrelation and further applies a threshold on an outcome of said operator beyond which said selected subset of parameters is considered an anonymized subset that is insufficient for determining an identity of the said one of the plurality of the network-connected devices.

17. The non-transitory computer readable medium according to claim 16, wherein in a case that said outcome is not above said specified threshold, determining said selected subset of parameters as a subset that is sufficient for determining an identity of the said one of the plurality of the network-connected devices and revising said selection criteria to similar and non-identical selection criteria.

18. The non-transitory computer readable medium according to claim 16, wherein said operator is division and said outcome is a quotient of said correlation divided by said autocorrelation, wherein in a case that said quotient is above a specified threshold, determining said selected subset of parameters as an anonymized subset that is insufficient for determining an identity of the said one of the plurality of the network-connected devices, and wherein in a case that said quotient is not above said specified threshold, determining said selected subset of parameters as a subset that is sufficient for determining an identity of the said one of the plurality of the network-connected devices.

19. The non-transitory computer readable medium according to claim 16, wherein the selection criteria include selecting a portion of a spatiotemporal space relating to said plurality of network-connected devices.

20. The non-transitory computer readable medium according to claim 15, wherein said network-connected devices comprise connect vehicles and wherein said parameters include at least one activity of said connected vehicles, wherein said activity is further associated with at least one of: time of occurring, and location of occurring.

21. The system non-transitory computer readable medium to claim 17, wherein said similar and non-identical selection criteria comprise a partial overlap of portions of a spatiotemporal space representing the respective selection criteria.

* * * * *